United States Patent [19]

Tanaka

[11] 4,174,918

[45] Nov. 20, 1979

[54] TAP HOLDER

[75] Inventor: Yukio Tanaka, Takarazuka, Japan

[73] Assignee: Showa Machine Industries Co., Ltd., Japan

[21] Appl. No.: 897,644

[22] Filed: Apr. 18, 1978

[51] Int. Cl.² .......................... B23B 31/38; B23G 3/00
[52] U.S. Cl. .................................. 408/139; 10/89 F; 10/89 H
[58] Field of Search ...................... 408/139, 140, 142; 10/89 H, 89 F, 141 R, 135 R

[56] References Cited

U.S. PATENT DOCUMENTS

| 1,527,757 | 2/1925 | Street | 10/89 F |
| 1,550,936 | 8/1925 | Veith | 408/140 |
| 3,002,206 | 10/1961 | Johnson | 408/139 |

FOREIGN PATENT DOCUMENTS 1431172  4/1976  United Kingdom ..................... 408/142

Primary Examiner—Z. R. Bilinsky
Attorney, Agent, or Firm—Wenderoth, Lind & Ponack

[57] ABSTRACT

A tap holder includes a holder body having at one end a bore for connecting a spindle of a machine and at the other end a cylindrical housing, a collet axially slidably mounted within the housing and connected to the housing through a clutch, and a spring detachably connected at one end to the holder body and slidably and rotatably connected at the other end to the collet so as to provide resilient movement of the collet.

7 Claims, 7 Drawing Figures

TAP HOLDER

BACKGROUND AND SUMMARY OF THE INVENTION

The present invention relates to tap holders, and more particularly, to a tap holder having an improved floating mechanism.

A conventional tap holder generally incorporates a floating mechanism which allows an axial movement of a tap during tapping so as to compensate for a difference between the pitch of the tap and the movement of a spindle for driving the tap holder.

When one tap is substituted for another having a different diameter, it is necessary to exchange a collet for holding the tap. In this case, it is preferable to vary the strength of a spring in the floating mechanism. Although a collet can be exchanged in a conventional tap holder, a floating mechanism cannot be readily exchanged to accommodate a different diameter of the tap.

It is therefore an object of the present invention to provide a tap holder which has a structure permitting ready exchange of a floating mechanism as well as a collet.

BRIEF DESCRIPTION OF THE DRAWINGS

Other objects and features of the present invention will be apparent from the following description of the invention with reference to the accompanying drawings, in which.

DETAILED DESCRIPTION OF THE INVENTION

Figure 1:
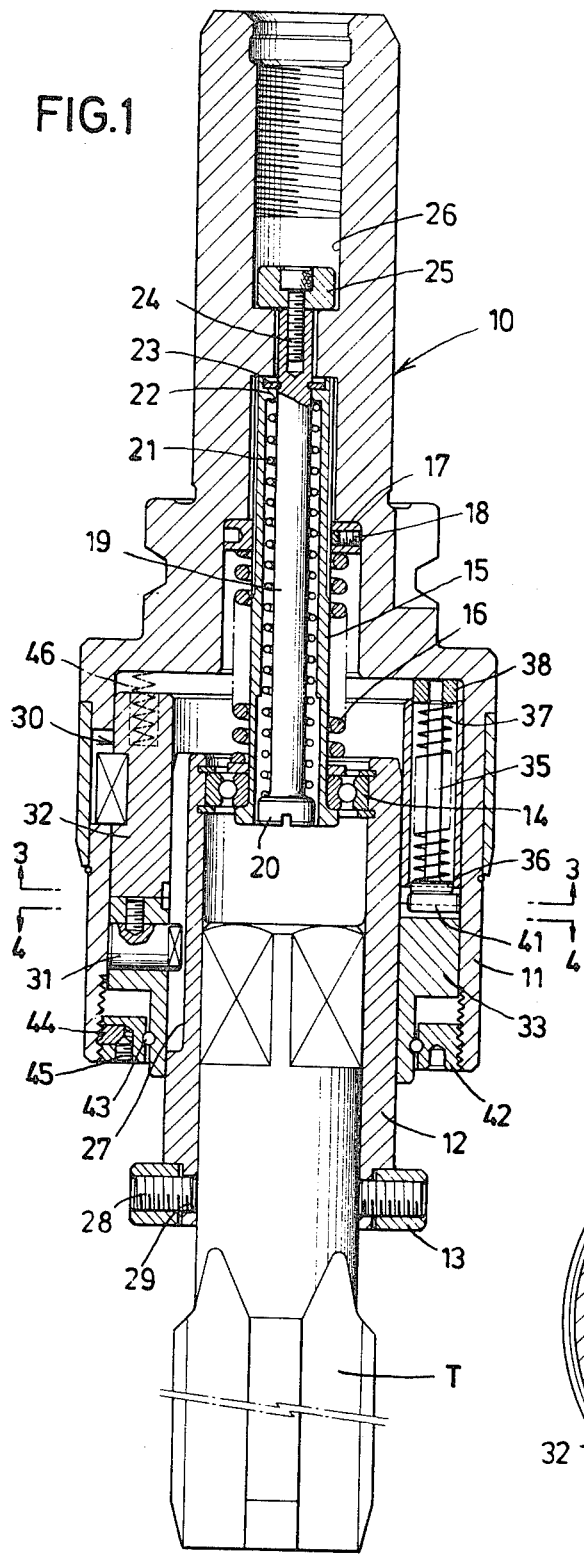
FIG. 1 is a longitudinally sectioned view showing a tap holder of the present invention.

Referring now to FIG. 1, a holder body generally indicated at 10 has at its end a cylindrical housing 11 in which is accommodated an axially slidable collet 12 through the intermediary of a clutch mechanism 30. About the lower end of the collet 12 is mounted a retaining ring 13 for preventing the removal of a tap T. In the upper end of the collet 12 is fixed a bearing 14 in which is slidably inserted a sleeve 15. About the sleeve 15 is mounted a first compression spring 16 between the bearing 14 and a ring 17 which is threaded about the sleeve 15 so that the strength of the spring 16 is adjustable. The position of the ring 17 is held by a set screw 18.

In the sleeve 15 is slidably inserted a pin 19 having a head 20 at the lower end thereof. A second compression spring 21 is mounted about the pin 19 between the head 20 and a shoulder 22 at the upper end of the sleeve 15. A bush 23 fixed about the pin 19 defines the upward movement of the sleeve 15. The upper end of the pin 19 is fixed to the holder body 10 by means of a bolt 24 and a retaining piece 25 which abuts a bottom of a bore 26 which is provided in the upper end of the holder body 10 for connection to a spindle of a machine. By loosening and disengaging the bolt 24, the pin 19 together with the sleeve 15 can be removed from the holder body 10.

Figure 4:
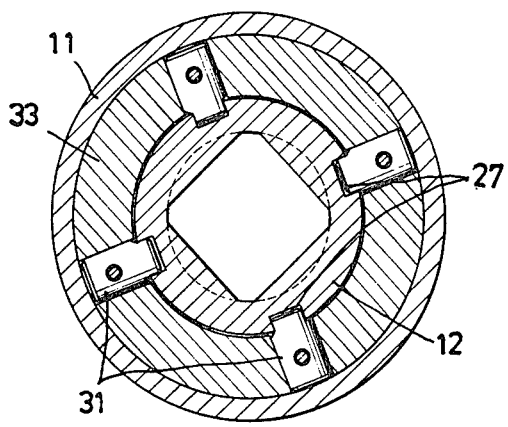
FIG. 4 is a sectional view along the line 4—4 of FIG. 1.

In the outer periphery of the collet 12 are provided axial grooves 27 each of which extends to the upper end of the collet 12 and slidably receives a key 31 fixed to the clutch mechanism 30, as shown in FIGS. 1 and 4. Therefore, by the disengagement of the pin 19 from the holder body 10, the collet 12 can also be removed out of the holder body 10.

Figure 2:
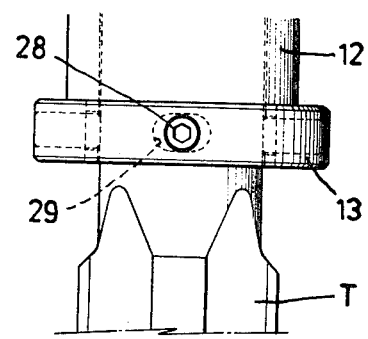
FIG. 2 is a front view of an outer end portion of a collet in a tap holder of the invention.
Figure 3:
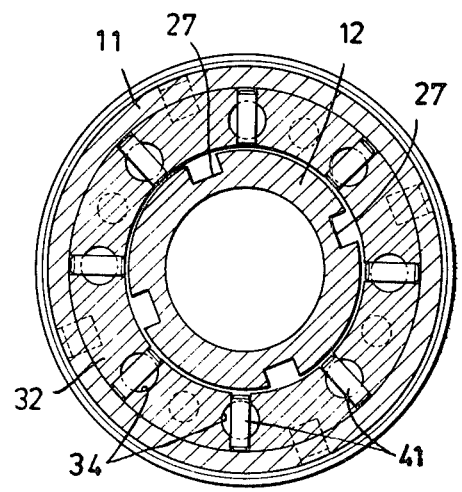
FIG. 3 is a sectional view along the line 3—3 of FIG. 1.

The tap T is retained in the collet 13 by the retaining ring 13 and set screws 28 the inner ends of which press the shank of the tap. The rotation of the tap T is prevented by the engagement of a square bore of the collet 12 (FIG. 4) with a square end of the shank of the tap. However, if a slight clearance exists between the square bore and square shaft, the tap will rotate slightly in relation to the collet 12 at the start of tapping operation. As a result, the screws 28 retaining the shank of the tap slip circumferentially in relation to the shank, thus causing the screws to loosen and the tap to come out of the collet 12 during operation. In order to prevent this, the ring 13 is rotatably fitted about the collet 12, and the screws 28 are threaded in the ring 13 so as to press the shank of the tap through circumferentially elongated or oblong holes 29 which are provided in the end portion of the collet 12, thereby permitting slight circumferential movement of the screws 28 together with the ring 13, as shown in FIG. 2.

As shown in FIGS. 1, and 3 through 7, the clutch mechanism 30 comprises a first cylinder 32 and a second cylinder 33 disposed between the inner periphery of the housing 11 and the outer periphery of the collet 12. The first cylinder 32 is nonrotatable in relation to housing 11 but rotatable in relation to the collet 12, while the second cylinder 33 is rotatable in relation to the housing 11 but nonrotatable in relation to the collet 12.

In the first cylinder 32 are provided a plurality of equally spaced, axial penetration holes 34. In each of the holes 34 is slidably inserted a pin 35 which has a head 36 at one end. A spring 37 such as disk or coil spring is mounted about the pin 35 between the head 36 and a bush 38 which is slidably inserted in the upper end of the hole 34 so as to urge the pin 35 downwardly. A recess 39 is provided in each of the holes 34 at the lower end thereof.

In the upper end of the second cylinder 33 are provided a plurality of radial grooves 40 correspondingly to the penetration holes 34 of the first cylinder 32. A roll 41 is retained in each space defined by the recess 39 and groove 40 while being pressed downwardly by the head 36 of the pin 35, as best seen from FIGS. 5 and 6. As is apparent, the recess 39 is wider than the diameter of the roll 41, while the groove 40 is narrower than the diameter thereof.

In the lower end of the housing 11 is threaded a ring 42 which is in rotatable engagement with the second cylinder 33 by means of a bearing 43, as shown in FIG. 1. The second cylinder 33 can be moved towards or away from the first cylinder 32 by the rotation of the ring 42, thus allowing the adjustment of pressure of the pins 35 against the rolls 41. The position of ring 42 is fixed by a cam piece 44 which is radially inserted into the ring 42 and which is pressed against the inner periphery of the housing 11 by revolving a screw 45.

In order to achieve tight engagement of the first cylinder 32 against the second cylinder 33, plural springs 46 force the first cylinder downwardly, as shown in FIG. 1.

Figure 6:
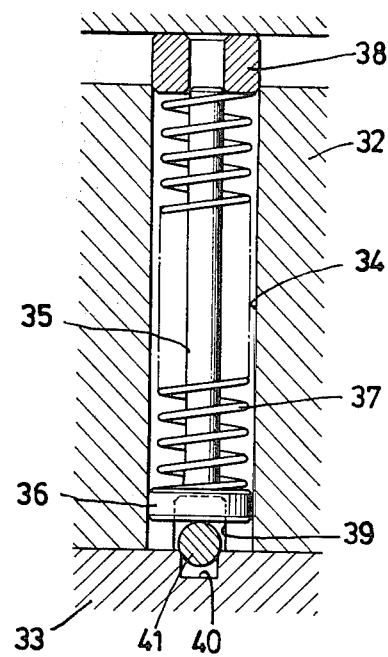
FIGS. 6 and 7 are longitudinal sectional views of a clutch mechanism of a tap holder of the invention.
Figure 5:
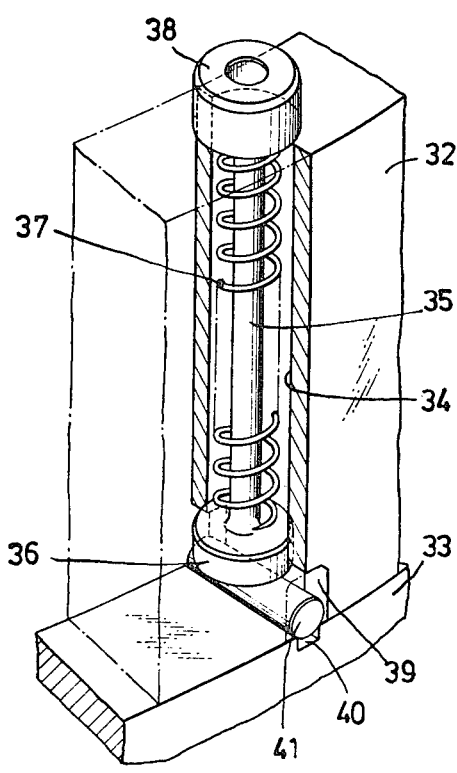
FIG. 5 is a perspective view, partially broken away, of a clutch mechanism of a tap holder of the invention.

In operation of the tap holder of the present invention, the rotation of the holder body 10 is transmitted to the first cylinder 32 which is in circumferentially fixed relation to the housing 11. Although the second cylinder 33 is not fixed to the housing 11 of the holder 10, a part of the roll 41 pressed by the pin 35 fits in the groove 40 of the second cylinder 33, as shown in FIG. 6, and the rotation of the first cylinder 32 is transmitted to the second cylinder 33. Since the collet 12 is in the circumferentially fixed engagement with the second cylinder 33, the tap T rotates together with the collet 12.

Figure 7:
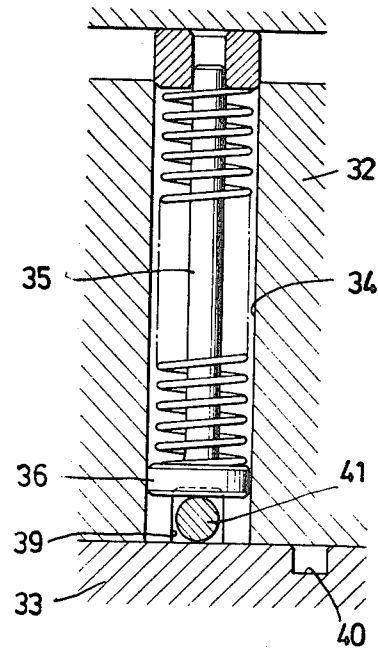

During tapping, when a rotational torque acting on the tap exceeds the pressure of spring 37 forcing the pin 35 downwardly, the roll 41 disengages from the groove 40, as shown in FIG. 7, whereby the first cylinder 32 does not transmit the rotation to the second cylinder 33. As understood, this function serves as a safety clutch.

Further, during tapping, if the pitch of the tap differs from the lowering speed of a spindle of a machine, the floating mechanism compensates for this difference. The collet 12 moves upwardly compressing the spring 16, and downwardly compressing the spring 21.

As described above, since the floating mechanism comprising the sleeve 15, spring 16, pin 19, spring 21 and other elements forms an assembly which is connected to the collet 12, and since the assembly together with the collet can be readily removed from the tap holder by disengaging the bolt 24 which fastens the pin 19 of the floating mechanism, if a variety of assemblies of floating mechanisms having various collets suitable for various taps and having different springs suitable for the taps are previously prepared, the tapping operation can be performed by a single tap holder. Further, since the assembly can be readily exchanged, the operation efficiency is greatly increased.

Still further, since the clutch mechanism is mounted about the collet, the total length of the tap holder can be reduced, in contrast with a conventional holder in which a clutch mechanism is provided on the collet.

What is claimed is:

1. A tap holder comprising:
   an elongated holder body having a first end and a second end, said first end having therein an axial bore for connection to a spindle for rotation of said holder body, and said second end having extending therefrom an axially extending cylindrical housing;
   a tap-supporting collet mounted for axial sliding movement within said housing;
   clutch means positioned within said housing for transferring rotation of said holder body to said collet and for interrupting transfer of said rotation when the rotation torque exceeds a predetermined maximum, said clutch means comprising a first cylindrical member positioned within said housing between said housing and said collet, said first cylindrical member being rotatively fixed with respect to said housing and freely rotatable with respect to said collet, a second cylindrical member positioned within said housing, axially of said first cylindrical member, between said housing and said collet, said second cylindrical member being freely rotatable with respect to said housing and rotatively fixed with respect to said collet, said second cylindrical member having an end adjacent said first cylindrical member, said end having therein a plurality of radially extending grooves, a plurality of rollers retained within said first cylindrical member and partially fitting into said grooves, and pressing means within said first cylindrical member for urging said rollers into said grooves; and
   means for axially resiliently connecting said collet to said holder body, said connecting means including first spring means for urging said collet axially away from said first end of said holder body, second spring means for urging said collet axially toward said first end of said holder body, and means for adjusting the urging force of said first spring means.

2. A tap holder as claimed in claim 1, wherein said connecting means further includes a pin having a first end detachably fixed to said holder body and a second end extending axilly into said collet, a sleeve fitted for sliding movement coaxially about said pin, said sleeve having a first end adjacent said first end of said holder body and a second end extending into said collet, said first spring means being fitted about said sleeve and having a first end acting on said collet, and said second spring means being fitted between said pin and said sleeve.

3. A tap holder as claimed in claim 2, wherein said adjusting means comprises a ring fitted to the exterior of said sleeve at an axially adjustable position therealong, and said first spring means has a second end bearing against said ring.

4. A tap holder as claimed in claim 2, further comprising axially extending bolt means for attaching said first end of said pin to said holder body, and wherein upon removal of said bolt means said connecting means and said collet are freely axially removable from said housing.

5. A tap holder as claimed in claim 1, wherein said pressing means comprises axially extending bores circumferentially spaced about said first cylindrical member, axial pins positioned in said axially extending bores, said pins having heads bearing against respective said rollers, and springs biasing said heads against said rollers.

6. A tap holder as claimed in claim 1, wherein said collet has a polygonal internal portion for receiving a polygonal head of a tap, and further comprising a retaining ring positioned about an outer end of said collet, said retaining ring having therein radially extending threaded bores, said collet having therein circumferentially elongated openings aligned with said threaded bores, and screws threaded into said threaded bores and freely passing through said elongated openings for engagement with a tap within said collet.

7. A tap holder as claimed in claim 1, further comprising a ring threaded into said housing, and means for connecting said ring to said second cylindrical member in a manner to prevent relative axial movement therebetween but to allow relative rotation therebetween.

* * * * *